United States Patent
Arinaga et al.

(10) Patent No.: US 8,749,089 B2
(45) Date of Patent: *Jun. 10, 2014

(54) COORDINATED CONTROL OF POWER CONVERTER AND PITCH ANGLE FOR WIND TURBINE GENERATION SYSTEM

(75) Inventors: Shinji Arinaga, Nagasaki (JP); Tsuyoshi Wakasa, Nagasaki (JP); Takatoshi Matsushita, Nagasaki (JP); Akira Yasugi, Nagasaki (JP); Masaaki Shibata, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,110

(22) Filed: Jul. 23, 2012

(65) Prior Publication Data

US 2012/0286510 A1    Nov. 15, 2012

Related U.S. Application Data

(63) Continuation of application No. 13/055,116, filed on Mar. 16, 2011, now Pat. No. 8,242,619, and a continuation of application No. PCT/JP2009/053079, filed on Feb. 20, 2009.

(51) Int. Cl.
*H02P 9/04* (2006.01)
(52) U.S. Cl.
USPC .............................................. 290/55; 290/44
(58) Field of Classification Search
None
See application file for complete search history.

(56) References Cited

U.S. PATENT DOCUMENTS

| | | | |
|---|---|---|---|
| 5,225,712 | A | 7/1993 | Erdman |
| 6,921,985 | B2 | 7/2005 | Janssen et al. |
| 7,015,595 | B2 | 3/2006 | Feddersen et al. |
| 7,042,110 | B2 | 5/2006 | Mikhail et al. |
| 7,449,794 | B2 | 11/2008 | Guey et al. |
| 8,053,917 | B2 | 11/2011 | Wakasa et al. |
| 2004/0145188 | A1 | 7/2004 | Jannssen |
| 2008/0277938 | A1 | 11/2008 | Oohara et al. |

FOREIGN PATENT DOCUMENTS

| | | |
|---|---|---|
| EP | 1590567 A1 | 11/2005 |
| JP | 2005-39924 A | 2/2005 |

(Continued)

OTHER PUBLICATIONS

International Search Report of corresponding International application No. PCT/JP2009/053079, mailed May 26, 2009.

(Continued)

*Primary Examiner* — Tulsidas C Patel
*Assistant Examiner* — S. Mikailoff
(74) *Attorney, Agent, or Firm* — Kanesaka Berner & Partners, LLP

(57) ABSTRACT

A wind power generation system is disclosed for suppressing an increase of torque when a voltage in a utility grid is restored, and to reduce a load to devices due to the torque. The wind power generation system includes a blade control unit for controlling the pitch angle of the wind turbine blades such that the pitch angle matches a target pitch angle determined on the basis of at least one of a wind speed, a rotation speed of the power generator, and a requested output power when the power control unit re-actuates the operations of the converter and the inverter.

2 Claims, 4 Drawing Sheets

(56) References Cited

FOREIGN PATENT DOCUMENTS

| | | |
|---|---|---|
| JP | 2006-37850 A | 2/2006 |
| JP | 2007-239599 A | 9/2007 |
| JP | 4015595 B2 | 11/2007 |
| KR | 1984-0002369 A | 6/1984 |
| TW | 200827548 A | 7/2008 |
| TW | M336997 U | 7/2008 |
| WO | 2004040748 A1 | 5/2004 |
| WO | 2004067958 A1 | 8/2004 |

OTHER PUBLICATIONS

Office Action for TW 098105993, issue Sep. 29, 2011.
Notification on the Grant of Patent Right for Invention issued on Apr. 7, 2013 for Chinese Patent Application No. 200980130881.6.
Canadian Notice of Allowance for corresponding Application No. 2731658.
Extended European Search Report dated Dec. 20, 2013, corresponds to European patent application No. 09840354.6.
Notice of Allowance issued Jul. 6, 2012 in Korean Application No. 10-2011-7002433.
Decision to Grant Patent for corresponding Japanese Patent Application No. 2011-500417 issued Dec. 25, 2012.

COORDINATED CONTROL OF POWER CONVERTER AND PITCH ANGLE FOR WIND TURBINE GENERATION SYSTEM

RELATED APPLICATIONS

The present application is a continuation of U.S. application Ser. No. 13/055,116, filed Mar. 16, 2011, which claims priority from, International Application Number PCT/JP2009/053079, filed Feb. 20, 2009, the disclosures of which are hereby incorporated by reference herein in their entirety.

TECHNICAL FIELD

The present invention relates to a wind power generation system and a method of controlling the wind power generation system.

BACKGROUND

When an accident occurs in a utility grid to which wind turbines are interconnected, there is a momentary drop in a voltage in the utility grid. The voltage drop in the utility grid leads to the following events occurring in the wind turbines.

(1) An over speed occurs as a result of a momentary drop in an output power of a power generator.

(2) A high current transiently flows through the power generator.

(3) A high current transiently flows through an electric motor of an auxiliary machine too.

In order to operate the wind turbines in safety in such an event, a control process called feathering is typically employed for shifting a pitch angle of wind turbine blades to set the blades in a feathered position, for example.

Further, when the voltage in the utility grid drops, a stator current and a rotor current of the power generator increase. Thus, in order to suppress an increase in the currents, there is a commonly used method of activating a crowbar circuit and such, short-circuiting a rotor coil of the power generator, and protecting a converter device and such from an overcurrent.

However, in a case in which the voltage in the utility grid is restored when the power generator is in the state as described above, a high current flows and a large torque occurs according to a slip frequency at this time.

FIG. 4 shows a relationship between a torque and a current with respect to a slip frequency of an induction machine. As shown in FIG. 4, it can be seen that both the torque and the current also increase as the slip frequency increases.

As used herein, the slip frequency is a parameter expressed by an equation (1) shown below.

Slip frequency=(Synchronous Rotation Speed−Induction Machine Rotation Speed)/Synchronous Rotation Speed (1)

When the slip frequency is greater than zero, the induction machine functions as an electric motor, and when the slip frequency is smaller than zero, the induction motor functions as a power generator (regenerative operation).

SUMMARY

An object of the present invention is to provide a wind power generation system capable of suppressing an increase in torque when the voltage in the utility grid is restored and reducing a load to the devices due to the torque, as well as to provide a method of controlling the wind power generation system.

According to a first aspect of the present invention, a wind power generation system is provided with: a power generator; a converter configured to convert an output of a rotor of the power generator from a three-phase AC power into a DC power; an inverter configured to convert the DC power outputted from the converter into a three-phase AC power; a power control unit configured to control the converter and the inverter, the power control unit controlling de-actuation and re-actuation of an operation of the converter and the inverter based on one of a rotor current of the power generator and the DC voltage converted by the converter; and a blade control unit configured to control a pitch angle of wind turbine blades, wherein the blade control unit controls: the pitch angle of the wind turbine blades, when the power control unit de-actuates the operation of the converter and the inverter, such that a rotation speed of the power generator becomes equal to or greater than a synchronous rotation speed, and the pitch angle of the wind turbine blades, when the power control unit re-actuates the operation of the converter and the inverter, such that the pitch angle matches a target pitch angle that is determined based on at least one of a wind speed, a rotation speed of the power generator, and a requested output power.

As described above, the de-actuation of the converter and the inverter are determined depending on the state of the rotor current of the power generator or the DC voltage converted by the converter regardless of the state of the utility grid. This is a commonly used control that has been conventionally employed. Accordingly, it is possible to sense a voltage drop in the utility grid using a conventional technique without requiring to provide a new sensor and such to sense whether or not the voltage in the utility grid has dropped. Further, when the converter and such are de-actuated, the blade control unit controls the pitch angle of the wind turbine blades such that the rotation speed of the power generator is equal to or greater than the synchronous rotation speed. Therefore, it is possible to prevent large torque or opposite load torque from occurring when the voltage in the utility grid is restored and the converter and the inverter are controlled to be re-actuated. This allows reduction of the load to devices due to torque.

This wind power generation system can be further provided with a crowbar circuit connected to a rotor coil of the power generator, and configured to be actuated in one of cases in which a current that flows through the rotor coil becomes equal to or greater than a previously-defined current threshold value and in which a DC voltage converted by the converter becomes equal to or greater than a previously-defined voltage threshold value and to cause a short-circuit in the rotor coil, wherein the blade control unit may control: the pitch angle of the wind turbine blades, when the crowbar circuit is actuated and when the power control unit de-actuates the operation of the converter and the inverter, such that the rotation speed of the power generator becomes equal to or greater than the synchronous rotation speed, and the pitch angle of the wind turbine blades, when the crowbar circuit is de-actuated and when the power control unit re-actuates the operation of the converter and the inverter, such that the pitch angle matches the target pitch angle that is determined based on at least one of the wind speed, the rotation speed of the power generator, and the requested output power.

As described above, when the crowbar circuit is provided, it is possible to switch the pitch angle control of the wind turbine blades considering the operational state of the crowbar circuit in addition to the operational states of the converter and the inverter.

According to a second aspect of the present invention, a method of controlling a wind power generation system that is provided with: a power generator; a converter configured to convert an output of a rotor of the power generator from a three-phase AC power into a DC power; an inverter configured to convert the DC power outputted from the converter into a three-phase AC power; and a power control unit configured to control the converter and the inverter, the power control unit controlling de-actuation and re-actuation of an operation of the converter and the inverter based on one of a rotor current of the power generator and the DC voltage converted by the converter, includes the steps of: controlling the pitch angle of the wind turbine blades, when the power control unit de-actuates the operation of the converter and the inverter, such that a rotation speed of the power generator becomes equal to or greater than a synchronous rotation speed, and controlling the pitch angle of the wind turbine blades, when the power control unit re-actuates the operation of the converter and the inverter, such that the pitch angle matches a target pitch angle that is determined based on at least one of the wind speed, the rotation speed of the power generator, and a requested output power.

According to the present invention, it is advantageously possible to suppress an increase of the torque when the voltage in the utility grid is restored, and to reduce the load to the devices due to the torque.

DETAILED DESCRIPTION

The following describes one embodiment of a wind power generation system and a method of controlling the wind power generation system according to the present invention with reference to the drawings.

Figure 1:
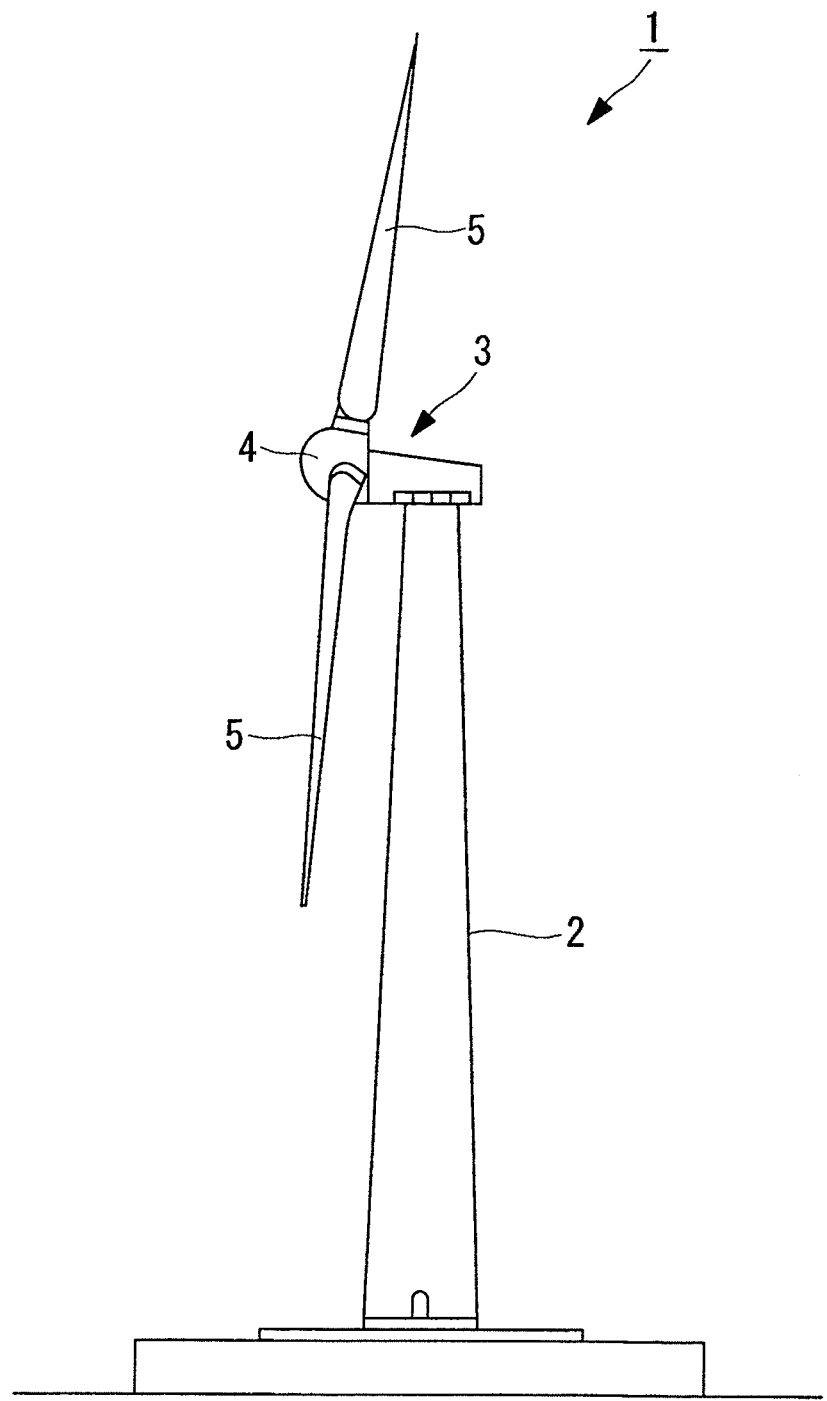
FIG. 1 is a drawing showing an entire structure of a wind power generation system according to one embodiment of the present invention.

FIG. 1 is a drawing showing an entire structure of the wind power generation system according to this embodiment. Referring to FIG. 1, a wind power generation system 1 includes a tower 2, a nacelle 3 disposed on a top end of the tower 2, and a rotor hub 4 rotatably provided for the nacelle 3 about a substantially horizontal shaft. The rotor hub 4 is provided with three wind turbine blades 5 arranged radially around the rotary shaft. With this, the power of wind blown against the wind turbine blades 5 from a direction of the rotary shaft of the rotor hub 4 is converted into the power that rotates the rotor hub 4 about the rotary shaft, and this power is in turn converted into electrical energy by the power generator housed within the nacelle 3.

Further, the nacelle 3 is provided with a wind speed anemometer (not shown in the drawing). The wind speed anemometer measures the wind speed and the wind direction. The nacelle 3 yaws in response to the wind speed and the wind direction measured by wind speed anemometer.

Figure 2:
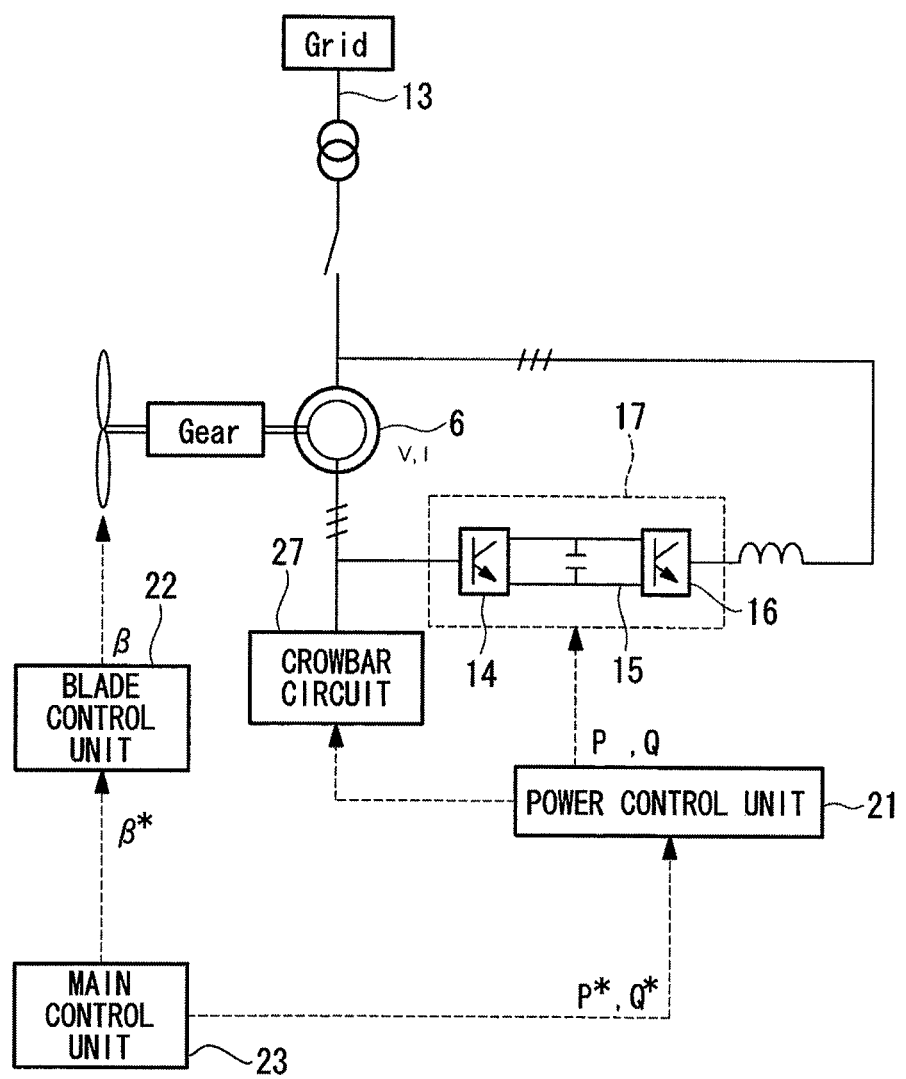
FIG. 2 is a block diagram showing one example of a structure including the power generator and its periphery.

FIG. 2 is a block diagram showing one example of a structure including a power generator 6 and its periphery. According to this embodiment, the power generator (induction machine) 6 is configured to output an electrical power that the power generator 6 generates to a utility grid 13 through both a stator coil and a rotor coil. Specifically, the power generator 6 is configured such that its stator coil is connected to the utility grid 13 and its rotor coil to the utility grid 13 via an AC-DC-AC converter 17.

The AC-DC-AC converter 17 is constituted from a converter 14, a DC bus 15, and an inverter 16, and converts an AC power received from the rotor coil into an AC power that conforms to a frequency of the utility grid 13. The converter 14 converts an AC power generated in the rotor coil into a DC power and outputs the DC power to the DC bus 15. The inverter 16 converts the DC power received from the DC bus 15 into an AC power of a frequency identical to that of the utility grid 13, and outputs the AC power.

The AC-DC-AC converter 17 also has a function of converting the AC power received from the utility grid 13 into an AC power that conforms to a frequency of the rotor coil, and is used to excite the rotor coil depending on the operational state of the wind power generation system 1. In this case, the inverter 16 converts an AC power into a DC power, and outputs the DC power to the DC bus 15. The converter 14 converts the DC power received from the DC bus 15 into an AC power that conforms to a frequency of the rotor coil, and supplies the AC power to the rotor coil of the power generator 6.

Further, the rotor coil is connected with a crowbar circuit 27 for protecting the converter 14 from an overcurrent. The crowbar circuit 27 is actuated when a current that flows through the rotor coil or a voltage of the DC bus 15 exceeds a previously defined threshold value, and causes a short-circuit in the rotor coil via a resistance. This attenuates the current of the rotor coil and prevents an overcurrent from flowing through the converter 14. Here, it is also possible to directly cause a short-circuit without a resistance.

Moreover, an electrical power line that connects the power generator 6 with the utility grid 13 is provided with a voltage/current sensor (not shown in the drawing) that measures an output voltage V and an output current I of the power generator 6. The values measured by the voltage/current sensor are supplied to a power control unit 21.

The power control unit 21 controls to switch a power transistor of the converter 14, in order to control an active power P and an reactive power Q that are outputted in response to an active power command P* and an reactive power command Q*. Specifically, the power control unit 21 calculates the active power P and the reactive power Q based on the output voltage V and the output current I measured by the voltage/current sensor. Then, the power control unit 21 generates a PWM (pulse width modulation) signal that makes a difference between the active power P and the active power command P* and a difference between the reactive power Q and the reactive power command Q* both zero, and supplies the generated PWM signal to the converter 14. The active power P and the reactive power Q are controlled in this manner.

The power control unit 21 monitors a rotor current of the power generator 6 and a DC link voltage, actuates the crowbar circuit 27 when these values exceed a current threshold value and a voltage threshold value that are previously set, and switches off the converter 14 and the inverter 16. This control is commonly employed.

In this manner, the control is switched based on the behavior of the rotor current of the power generator 6 and the DC link voltage instead of actuating the crowbar circuit 27 and such according to the behavior of the voltage in the utility grid, and therefore it is not necessary to add a new function or to set a new criterion for determination in order to sense a voltage drop in the utility grid.

A blade control unit 22 controls a pitch angle β of the wind turbine blades 5 in response to a pitch command β*. Specifically, the blade control unit 22 controls such that the pitch angle β of the wind turbine blades 5 matches the pitch command β*.

A main control unit 23 controls the power control unit 21 and the blade control unit 22.

Figure 3:
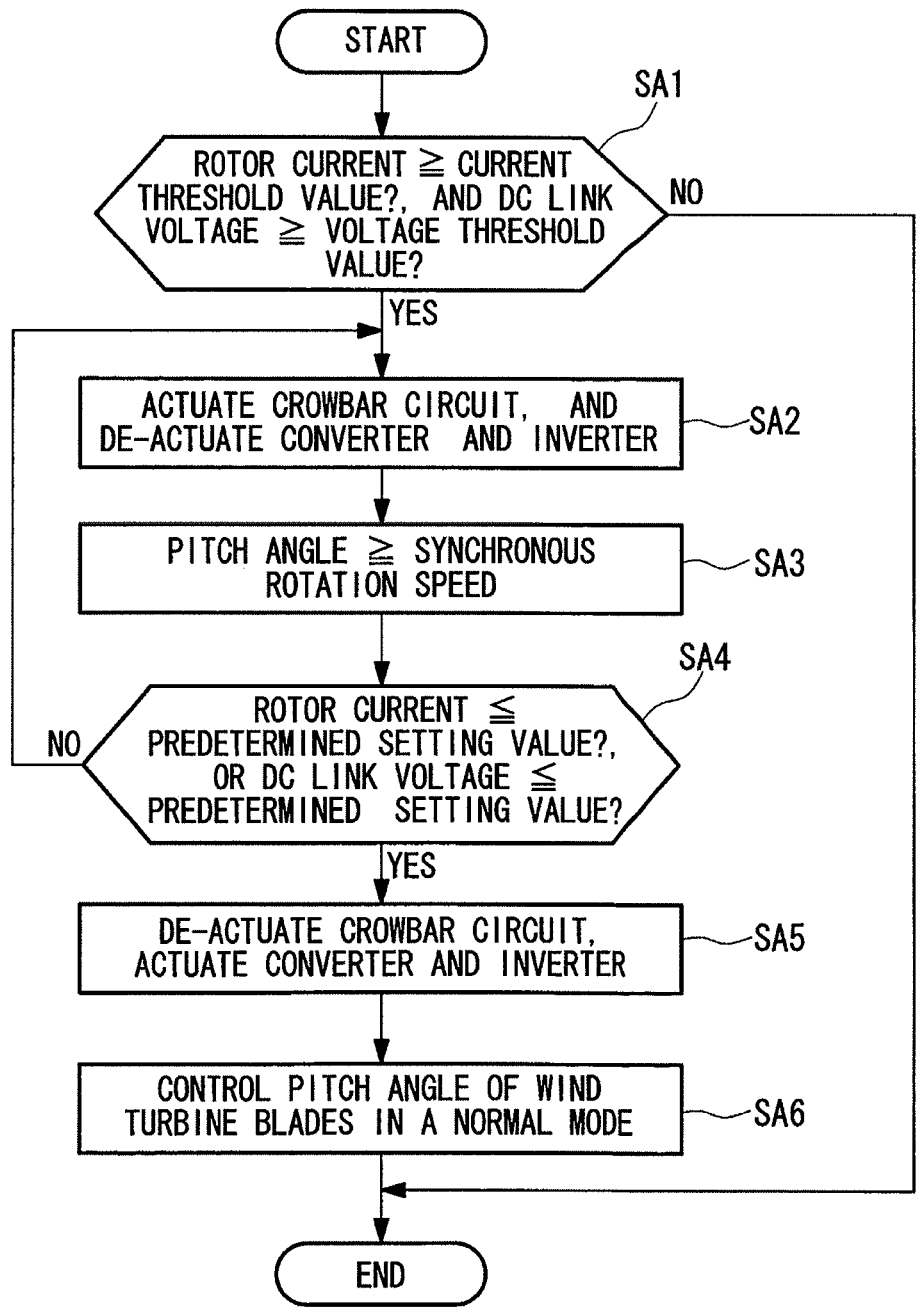
FIG. 3 is a flowchart explaining a control of the wind power generation system according to one embodiment of the present invention.
Figure 4:
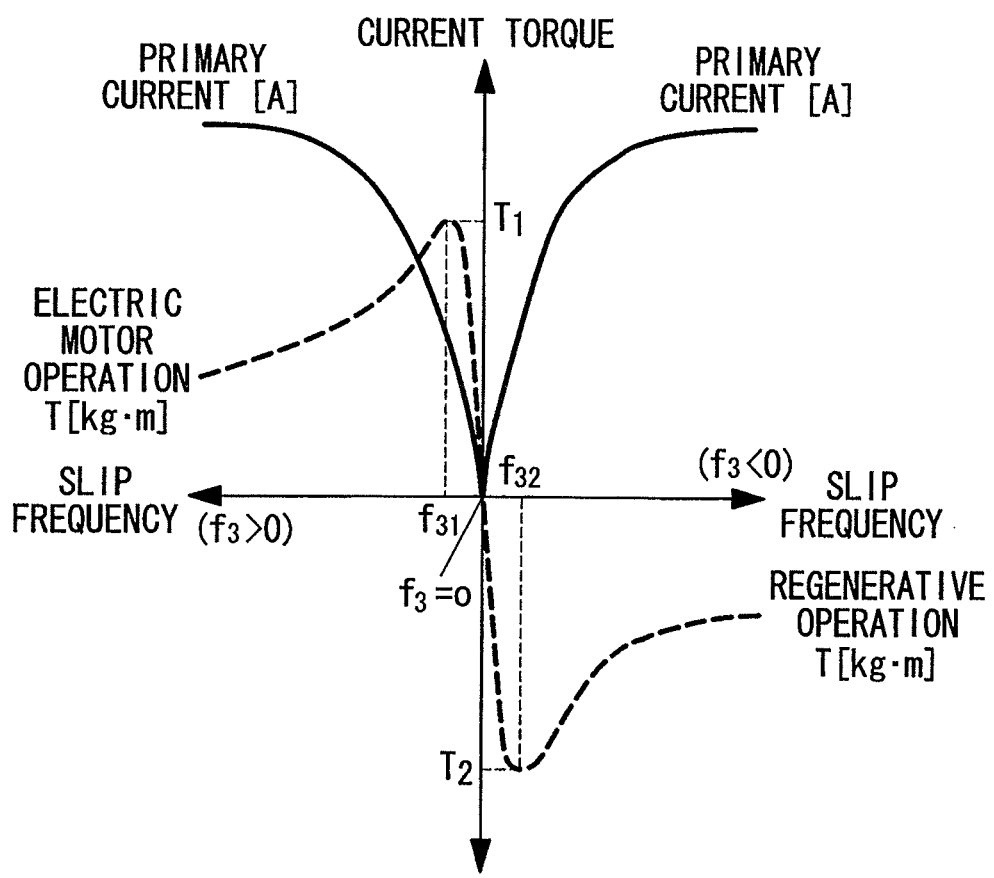
FIG. 4 is a chart showing a relationship between a torque and a current with respect to a slip frequency of an induction machine.

Next, a method of controlling the wind power generation system according to this embodiment when the voltage in the utility grid drops is described with reference to FIG. 3.

First, when the voltage in the utility grid drops, because of, for example, an accident occurring in the utility grid, the rotor current of the power generator 6 increases, and a voltage of a DC link 15 (in other words, the DC voltage converted by the converter 14) increases.

The power control unit 21 determines whether or not the rotor current of the power generator 6 is equal to or greater than the current threshold value that is previously set, and whether or not the voltage of the DC link 15 is equal to or greater than the voltage threshold value that is previously set (Step SA1). If at least one of the current and the voltage exceeds the corresponding threshold value ("YES" in Step SA1), the power control unit 21 actuates the crowbar circuit 27, and de-actuates an operation of the converter 14 and the inverter 16 (Step SA2).

This actuates the crowbar circuit 27, and a short-circuit is caused in the rotor coil via the resistance. Further, by de-actuating the operation of the converter 14 and the inverter 16, an electrical power supply to the utility grid 13 stops.

Further, the power control unit 21 outputs a signal indicating that the crowbar circuit 27 is actuated to the blade control unit 22. In response to the actuation of the crowbar circuit 27, the blade control unit 22 controls the pitch angle of the wind turbine blades such that a rotation speed of the power generator 6 is equal to or greater than a synchronous rotation speed (Step SA3). In this manner, the rotation speed of the power generator 6 is maintained at a value equal to or greater than the synchronous rotation speed.

Then, when the utility grid voltage is restored and if the power control unit 21 determines either that the rotor current is equal to or smaller than a predetermined setting value or that the voltage of the DC link 15 is equal to or smaller than a predetermined setting value ("YES" in Step SA4), the power control unit 21 de-actuates the operation of the crowbar circuit 27, and re-actuates the driving of the converter 14 and the inverter 16 (Step SA5).

Further, the power control unit 21 outputs a signal indicating that the operation of the crowbar circuit 27 has been de-actuated to the blade control unit 22. In response to the de-actuation of the crowbar circuit 27, the blade control unit 22 switches the control of the pitch angle of the wind turbine blades to a normal mode (Step SA6). Specifically, the blade control unit 22 controls the pitch angle of the wind turbine blades such that the pitch angle matches a target pitch angle that is determined based on at least one of the wind speed, the rotation speed of the power generator 6, and a requested output power.

As described above, the wind power generation system and the method of controlling the wind power generation system according to this embodiment, the pitch angle of the wind turbine blades is controlled such that the rotation speed of the power generator 6 is identical to the synchronous rotation speed during a time period in which the converter 14 and the inverter 16 are de-actuated. Therefore, it is possible to make the slip frequency of the power generator 6 zero or a value approximated by zero when the voltage in the utility grid is restored and the converter 14 and the inverter 16 starts driving.

This allows to suppress the increase in the torque that transiently occurs when the voltage in the utility grid is restored, and to prevent an adverse effect to devices from occurring due to the increase of the torque. In particular, it is possible to prevent an adverse effect to gears of a gear box from occurring due to the increase of the torque.

In the above embodiment, the control of the pitch angle of the wind turbine blades is switched when the operations of the converter 14 and the inverter 16 are de-actuated and the crowbar circuit 27 is actuated. However, alternatively, it is possible to control the pitch angle of the wind turbine blades such that the rotation speed of the power generator 6 is equal to or greater than the synchronous rotation speed when the operations of the converter 14 and the inverter 16 are de-actuated, or when the crowbar circuit 27 is actuated, for example.

Further, a condition for actuating the crowbar circuit 27 can be different from a condition for de-actuating the converter 14 and the inverter 16.

The invention claimed is:
1. A wind power generation system comprising:
a power generator;
wind turbine blades configured to receive wind and drive the power generator;
a converter configured to convert an output of the power generator from a three-phase AC power into a DC power;
an inverter configured to convert the DC power outputted from the converter into a three-phase AC power;
a power control unit configured to control the converter and the inverter on the basis of one of a rotor current of the power generator and a DC voltage of the DC power converted by the converter so that the converter and the inverter are de-actuated when said one of the rotor current and the DC voltage exceeds a corresponding threshold value, and the converter and the inverter are re-actuated when said one of the rotor current and the DC voltage is equal to or less than the corresponding threshold value;
a blade control unit configured to control a pitch angle of the wind turbine blades;
a crowbar circuit connected to a rotor coil of the power generator, and configured to be actuated in one of cases including:
a current flowing through the rotor coil becomes equal to or greater than a previously-defined current threshold value, and
the DC voltage of the DC power converted by the converter becomes equal to or greater than a previously-defined voltage threshold value to cause a short-circuit in the rotor coil,
wherein
the blade control unit is configured to control the pitch angle of the wind turbine blades,
when the power control unit re-actuates the converter and the inverter, the blade control unit is configured to cause the pitch angle to match a target pitch angle determined on the basis of at least one of a wind speed, a rotation speed of the power generator, and a requested output power,
the blade control unit is further configured to control the pitch angle of the wind turbine blades, when the crowbar circuit is actuated and when the power control unit de-actuates the converter and the inverter, to cause the rota- tion speed of the power generator to become equal to or greater than a synchronous rotation speed, and the blade control unit is further configured to control the pitch angle of the wind turbine blades, when the crowbar circuit is de-actuated and when the power control unit re-actuates the converter and the inverter, to cause the pitch angle to match the target pitch angle determined on the basis of at least one of the wind speed, the rotation speed of the power generator, and the requested output power.

2. A method of controlling a wind power generation system, the system including:

a power generator;

wind turbine blades configured to receive wind and drive the power generator;

a converter configured to convert an output of the power generator from a three-phase AC power into a DC power;

an inverter configured to convert the DC power outputted from the converter into a three-phase AC power;

a power control unit configured to control the converter and the inverter on the basis of one of a rotor current of the power generator and a DC voltage of the DC power converted by the converter so that the converter and the inverter are de-actuated when said one of the rotor current and the DC voltage exceeds a corresponding threshold value, and the converter and the inverter are re-actuated when said one of the rotor current and the DC voltage is equal to or less than the corresponding threshold value; and a crowbar circuit connected to a rotor coil of the power generator, and configured to be actuated in one of cases including:

a current flowing through the rotor coil becomes equal to or greater than a previously-defined current threshold value, and the DC voltage of the DC power converted by the converter becomes equal to or greater than a previously-defined voltage threshold value to cause a short-circuit in the rotor coil;

the method comprising:

controlling a pitch angle of the wind turbine blades, when the power control unit re-actuates the converter and the inverter, such that the pitch angle matches a target pitch angle determined on the basis of at least one of a wind speed, a rotation speed of the power generator, and a requested output power, said method comprising:

controlling the pitch angle of the wind turbine blades, when the crowbar circuit is actuated and when the power control unit de-actuates the converter and the inverter, to cause the rotation speed of the power generator to become equal to or greater than a synchronous rotation speed, and controlling the pitch angle of the wind turbine blades, when the crowbar circuit is de-actuated and when the power control unit re-actuates the converter and the inverter, to cause the pitch angle to match the target pitch angle determined on the basis of at least one of the wind speed, the rotation speed of the power generator, and the requested output power.

* * * * *